United States Patent [19]

Southerland et al.

[11] Patent Number: 4,804,814
[45] Date of Patent: Feb. 14, 1989

[54] ELECTRON DISCHARGE MACHINING TOOL

[75] Inventors: Tommy J. Southerland, Lafayette, Ga.; Eugene L. Hinds, Hixson, Tenn.; Timothy L. Brown; Eric A. Kiesche, both of Ringgold, Ga.

[73] Assignee: Combustion Engineering, Inc., Windsor, Conn.

[21] Appl. No.: 105,940

[22] Filed: Oct. 8, 1987

[51] Int. Cl.$^4$ .............................................. B23K 9/16
[52] U.S. Cl. ................................ 219/69 V; 219/69 D; 219/69 G
[58] Field of Search ............... 219/69 R, 69 D, 69 E, 219/69 G, 69 V; 313/237; 204/129.5, 129.7

[56] References Cited

U.S. PATENT DOCUMENTS

| | | | |
|---|---|---|---|
| 3,711,676 | 1/1973 | Witzel | 219/69 D |
| 3,758,739 | 9/1973 | De Jongh et al. | 219/69 G |
| 3,851,135 | 11/1974 | Moracz et al. | 219/69 M |
| 4,565,914 | 1/1986 | Suzaki et al. | 219/69 E X |
| 4,628,171 | 12/1986 | Colby et al. | 219/69 G |
| 4,705,932 | 11/1987 | Aso et al. | 219/69 D X |

*Primary Examiner*—Eugene R. LaRoche
*Assistant Examiner*—Seung Ham
*Attorney, Agent, or Firm*—John H. Mulholland

[57] ABSTRACT

An electron discharge machining (E.D.M.) tool combination is useful for removal of an installed nuclear steam generator tube plug of conductive material. A conductive wand shaft connected to an E.D.M. voltage source is movably mounted in a housing and insulated from the housing. An inlet adapter is mounted on the wand end and connected to a source of deionized and demineralized water to provide a dielectric fluid and removed material carrier. A hollow electrode is mounted on a hollow extension beyond the end of the wand and inlet adapter in fluid communication with the adapter for movement with the wand relative to the housing. A drive plate is moved by means of a ball nut along a roller ball shaft which is rotationally driven by a motor in the housing. The drive plate reciprocates the wand and electrode for E.D.M. operation. The wand position can be monitored remotely by a signal from a potentiometer with a tap movable with the wand.

4 Claims, 3 Drawing Sheets

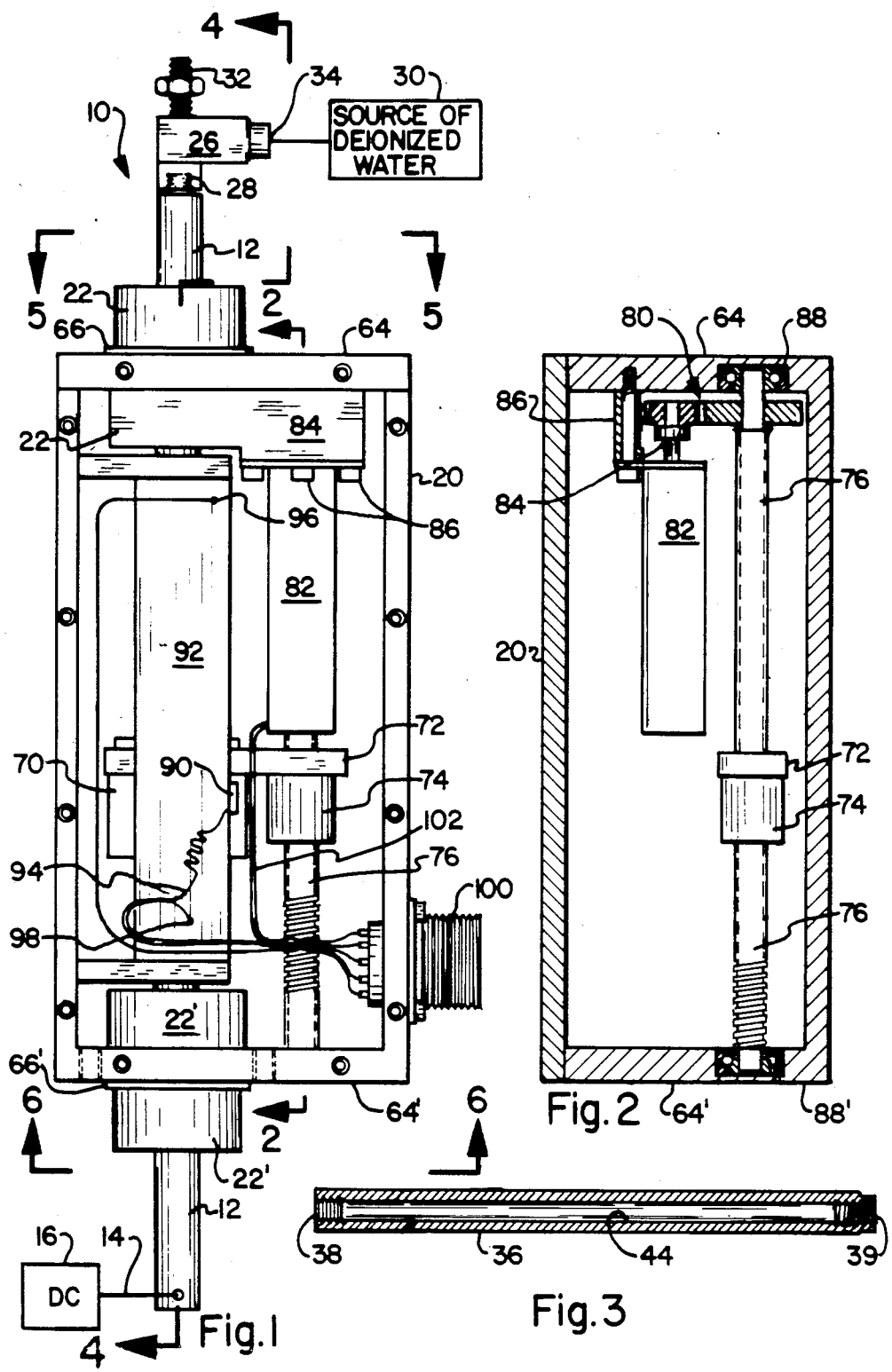

ELECTRON DISCHARGE MACHINING TOOL

BACKGROUND OF THE INVENTION

This invention relates generally to the field illustrated by "plugging" U.S. Pat. Nos. 4,262,187 and 4,513,786; "tube removal" U.S. Pat. Nos. 3,492,453 and 3,986,245; and "plug removal" U.S. Pat. 4,679,315, all assigned to the same assignee as the instant invention.

The invention is a tool for electron discharge machining (E.D.M.) to remove an installed tube plug in the end of a steam generator tube associated with a pressurized water type of nuclear reactor (PWR). At the lower end of a typical steam generator of this type, a tube sheet having an array of tube-end receiving bores separates the primary side of the heat exchanger, which includes the lower primary chamber and tube interiors of all the U-shaped tubes beginning and ending in the tube sheet (the tube bundle), from the secondary side which contains the water and steam heated in the heat exchanger for use by electric power generating turbines in communication with the steam generator.

Plugging the occasional leaking tube or the more common degraded tube is now frequent in PWR plant operation. A recent development is the emphasis on tube plugs that can be removed easily, but in earlier repair operations, permanently welded or explosively expanded plugs were commonly used. These plugs, and even some plugs that are designed to be easily removed, often must be drilled out of the tube, either for inspection purposes, further repair purposes, or when it is necessary to repair and return a previously plugged tube to heat exchange service.

The drilling operation, when used, provides problems of time which result in high man-rem exposure rates for the workmen. This is due to the requirement of multiple entries of the workmen into the primary side chamber, drill breakage from drilling the radiation exposed hardened material, and drill lead-off into the tube sheet and the resulting need for extensive repair work.

Advantages which are available by use of the remote electron discharge machining tool of the invention are:

1 The E.D.M. process uses very little cutting pressure, thus the tooling exerts almost no forces against the plug or tube sheet to cause lead-off or breaking;

2 The E.D.M. process is a single pass process, with a minimum amount of entries into the steam generator to accomplish the task of tube plug removal;

3 The E.D.M. process removes no metal from the inside diameter of the tube, leaving a tube which could possibly be returned to service.

The process of electron discharge machining is generally known and includes the removal of material by spark erosion. The sparks are created by an electrical discharge across a gap between an electrode and a grounded conductive workpiece. The gap is typically filled with a dielectric fluid which contains constituents such as flourides, chlorides, sulfides and other materials which would be harmful to the Inconel tubing of a PWR steam generator.

SUMMARY OF THE INVENTION

The invention relates to an electron discharge machining tool which is specifically designed to be used in PWR steam generators with a flow of non-contaminating deionized and demineralized water as the dielectric fluid and removed material carrier. The tool may be mounted in known manner on a support platform temporarily hung from the underside of the tube sheet or may be mounted at the end of an articulated tool holding arm or other tool manipulating device in the primary side chamber.

The tool itself includes a conductive wand shaft suitably connected by means of a flexible conductor cable to a pulsed DC 40 amp capacity E.D.M. power source produced by Hansdedts of Urbana, Ill., as Model 150B and Booster Model 155. The wand shaft is movably mounted within, and electrically insulated from, a support means in the form of a shell or housing with end plates and ball bushing oil seals within seal housings at either end of the shell.

A deionized and demineralized water inlet adapter is mounted on the wand shaft for connection to a source of the dielectric fluid. A conductive hollow wand extension of stainless steel or the like is in fluid communication with the inlet adapter and fixed, as by a threaded connection, for movement therewith. At the end of the wand extension opposite the inlet adapter, a hollow graphite or tungsten-copper electrode, of appropriate shape for the material to be removed, is removably attached in fluid communication therewith.

An insulator block member is secured to the conductive wand shaft for movement in response to movement of a drive plate secured thereto. A driven Saginaw ball nut is drivingly connected to the drive plate for reciprocation of the conductive wand relative to the shell support means or housing. The nut is selectively reciprocated by means of a threaded rolled ball screw (Saginaw type) in driving engagement therewith. A common gear reduction drive train rotates the shaft in response to actuation of a motor mounted adjacent thereto within the housing.

The position of the wand relative to the support means is sensed by a tap mounted on the insulator for movement along a voltage dividing potentionmeter which movement creates a voltage signal dependent on the position of the wand, which voltage signal is convenient for use in remote monitoring of the position of the wand.

BRIEF DESCRIPTION OF THE DRAWINGS

FIG. 1 is a schematic elevational view of the election discharge machining tool combination of the invention with the housing open to show the location of several elements of the combination;

FIG. 2 is a cross-sectional elevational view taken along the line 2—2 of FIG. 1;

FIG. 3 is a cross-sectional view of a conductive hollow wand extension for threadedly fixing in fluid communication with the deionized water dielectric fluid inlet adapter;

DESCRIPTION OF THE PREFERRED EMBODIMENT

Figure 4:
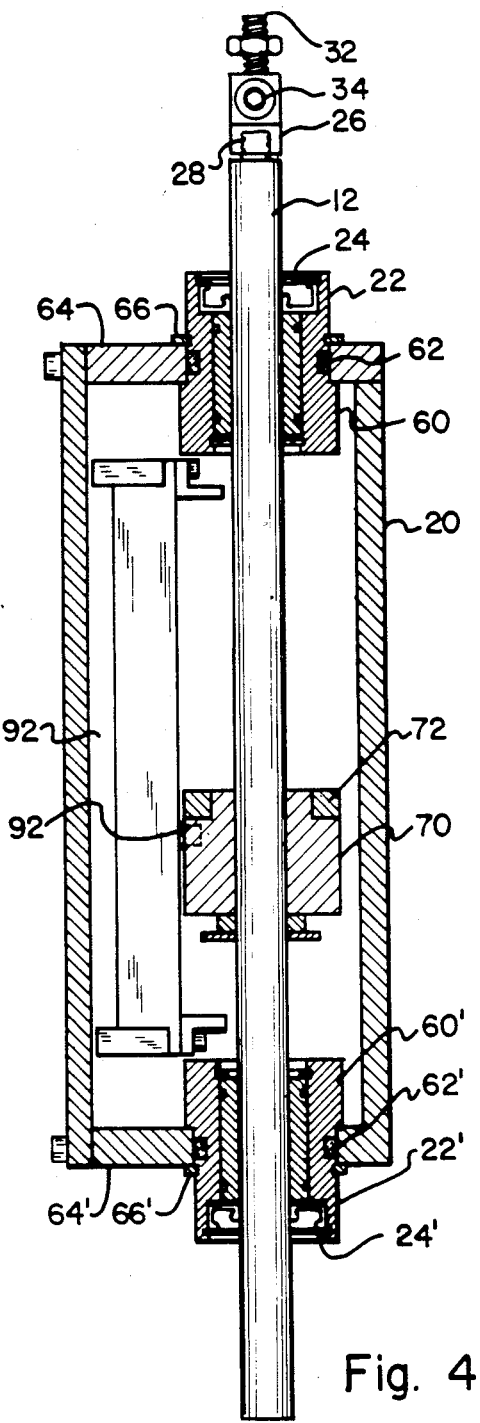
FIG. 4 is a cross-sectional elevational view taken along the line 4—4 of FIG. 1 with the wand shaft shown in full.
Figure 5:
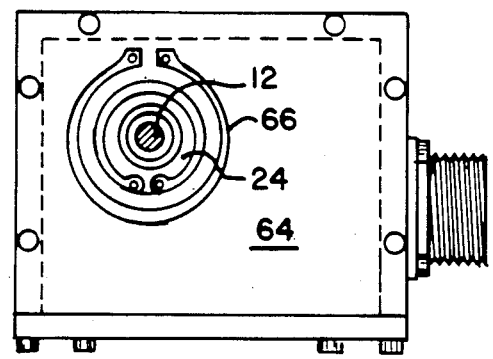
FIG. 5 is a cross-sectional view taken along the line 5—5 of FIG. 1.
Figure 6:
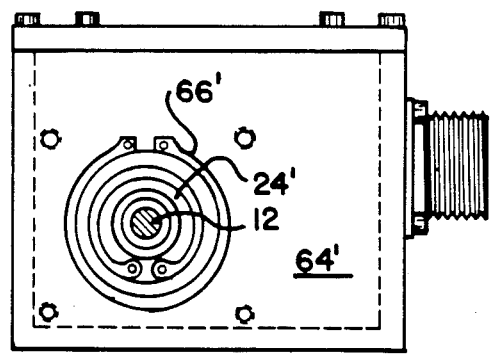
FIG. 6 is a cross-sectional view taken along the line 6—6 of FIG. 1.
Figure 7:
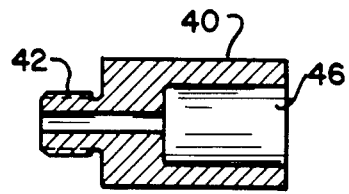
FIGS. 7 and 7a–7d are enlarged cross-sectional views of hollow dielectric fluid conducting electrodes for use on the end of the conductive hollow wand extension.
Figure 7A:
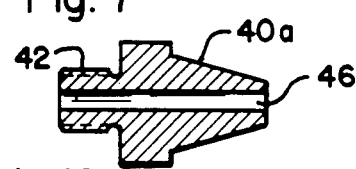
Figure 7B:
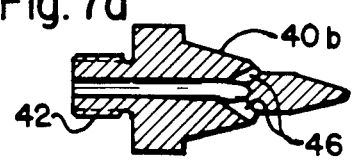
Figure 7C:
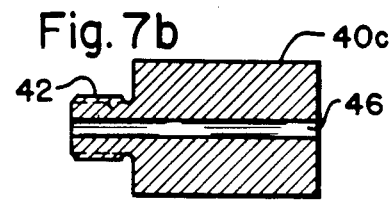
Figure 7D:
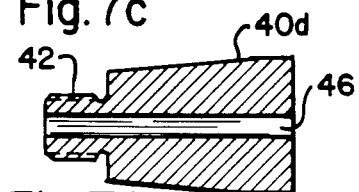

The numeral 10 generally designates the electron discharge machine tool for removal of an installed tube plug in the end of a steam generator tube in accordance with the principles of the invention. The tool 10 includes a wand shaft 12 connected by means of a flexible conductor cable schematically shown as 14 to a pulsed 40 amp capacity DC E.D.M. power source schematically shown in box form and designated by the numeral 16 in FIG. 1. The wand shaft 12 is movably mounted within a shell or housing 20 which acts as a support means for the tool combination. The shell or housing 20 is mounted in position for operation, as earlier mentioned, by means of an adapter plate fixed thereto and temporarily hung from a tube sheet, an articulated arm or other common steam generator tool support apparatus. The housing 20 has seal housings 22 and 22' containing ball bushings and oil seal assemblies 24 and 24' which permit axial movement of the wand shaft 12 relative to the housing 20.

At the upper end of the wand 12 is a deionized and demineralized water inlet adapter 26 which is suitably secured, as for instance, by a threaded connection 28, to the wand 12. The adapter 26 has a fluid connection (schematically shown) to a source 30 of deionized and demineralized water. A hollow threaded outlet portion 32 at the upper end of the adapter 26 provides an outlet in communication with the inlet 34 which is connected to the water source 30.

The threaded connection 32 receives a conductive hollow wand extension member 36, as shown in FIG. 3, in fluid communication therewith. The extension 36 is attached at one of its ends to the adapter 26 by means of internal threads 38 which engage the exterior threaded portion 32 of the adapter 26. On the opposite end of the extension 36 from threaded bore portion 38 is a threaded end 39. Threads 39 are for connection of an electrode such as 40, 40a, 40b, 40c or 40d, which is of graphite or copper-tungsten material with a threaded portion 42 for engagement with threaded end 39 of wand extension 36, in both electrically conductive and fluid conducting relationship therewith. Thus, it will be seen that from the source of deionized and demineralized water 30, the dielectric fluid passes into the port 34 on adapter 26 and upwards through the hollow-threaded connection member 32 thereof and into and along the central passageway 44 of wand extension member 36. From there it flows into the dielectric passageway 46 of the electrodes 40, 40a, 40b, 40c and 40d.

Figure 8:
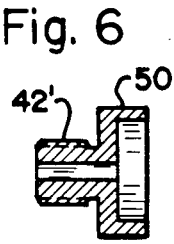
FIG. 8 is an enlarged cross-sectional view of an electrode holder for use on the end of the conductive hollow wand extension.
Figure 9:
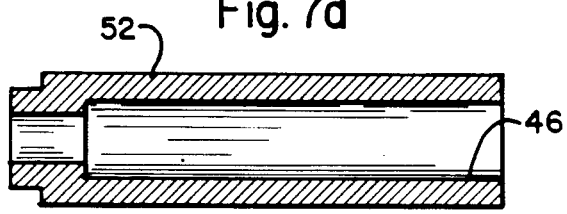
FIG. 9 is an enlarged cross-sectional view of an electrode for use in the holder of FIG. 8.

Instead of directly mounting an electrode 40, an alternative electrode arrangement as shown in FIGS. 8 and 9 may be utilized. The electrode holder 50, as shown in FIG. 8 as having a threaded portion 42' for engagement with the threads 39 of wand extension 36, can be utilized such that replaceable and separate electrode members 52 may be quickly and easily inserted and press fit into the holder 50.

Figure 10:
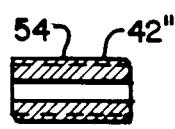
FIG. 10 is an enlarged cross-sectional view of an adapter for use on the end of the conductive hollow wand extension.
Figures 11, 11A:
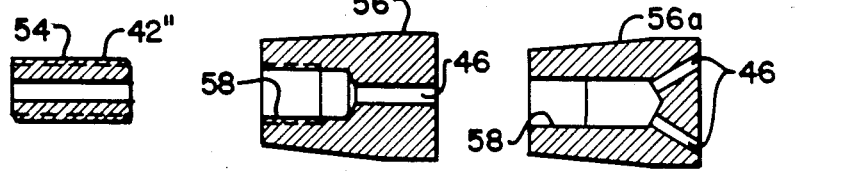
FIGS. 11 and 11a are enlarged cross-sectional views of hollow dielectric fluid conducting electrodes for use on the end of the conductive hollow wand extension by means of the adapter of FIG. 10.

FIG. 10 illustrates an adapter for engagement, as an alternative, with the threads 39 of wand extension 36. The hollow adapter 54 of FIG. 10, with its threads 42'', provides a threaded connection for electrodes 56 and 56a, both of which have an internally threaded portion 58 for engagement of the threads 42'' as will be seen in FIGS. 11 and 11a. The electrodes 56, 56a operate on the same principles as the other electrodes 40, 40a, 40b, 40c, 40d and 52, and are of the same type of material. The major difference between the various electrodes relates to the choice of an appropriate shape for the material to be removed from the grounded conductive workpiece or plug within the steam generator tube end adjacent the tube sheet of the steam generator (not shown).

As previously stated, the seal housings 22 and 22', and bushings 24, 24' that they contain, are to insulate the wand shaft 12 from the shell 20. The ball bushings within the seal housings 22 and 22' are conventional and known as "Thompson Super 8" and are housed within insulating material, such as a Delrin plastic sleeve 60, 60' within the seal housings 22, 22'. A suitable O-ring seal 62, 62' seals the inner shell portion through top end plate 64 and bottom end plate 64' with the entire assembly held in place by snap rings 66 an 66', respectively.

As the wand 12 is free to move relative to the shell or housing 20, it is responsive to a driving force applied to it by means of a Delrin insulating block 70 securely attached thereto to travel together as a unit. Fixed to the upper end of the insulating block 70 is a drive plate 72. A driven Saginaw ball nut 74 is drivingly connected to the drive plate 72, as will be seen for example in FIG. 2, for reciprocation of the conductive wand 12 relative to the shell support means or housing 20. The nut 74 is selectively reciprocated by means of a threaded or rolled ball Saginaw type screw 76 in driving engagement therewith. A common gear reduction drive train, generally designated by the numeral 80, rotates the shaft 76 in response to actuation of a motor 82 secured by means of a motor mount 84 and bolts 86 to a top plate 64 of the shell 20. The Saginaw ball shaft 76 rides in suitable ball bushings 88 and 88' in the top and bottom end plates respectively of the housing 20.

The position of the wand 12 relative to the support means or housing 20 is important, particularly in the event it is necessary to withdraw the tool from position within the tube sheet to replace an electrode. For this purpose, the position of the wand 12 relative to the support means 20 may be sensed by a tap 90 fixed to the insulating block 70 for movement with it and the wand along a voltage divided potentiometer 92. The tap 90, by means of a flexible conductor schematically shown and designated by the numeral 94, as well as end conductors 96 and 98 at the opposite ends of the potentiometer 92, are connected to a multi-conductor connector 100 such that the current flow and signals can be remotely utilized to monitor the position of the wand 12 and, therefore, the electrode mounted on the end of its wand extension member 36. Also electrically connected to the connector 100, are leads 102 for the motor 82.

As previously indicated, the insulating parts are generally made of Delrin plastic and the metallic parts, except for the electrodes, are of suitable stainless steel to withstand the harsh environment of a nuclear steam supply system steam generator. Thus, it will be seen that a novel electron discharge machine tool combination for removal of an installed nuclear steam generator tube plug of conductive material has been provided for use with conventional tool support and manipulating apparatus within the primary side chamber of a steam generator.

We claim:

1. An electron discharge machining tool combination for removal of an installed nuclear steam generator tube plug of conductive material, comprising:
    a conductive wand shaft connected to a source of voltage and movably mounted within, and electrically insulated from, a support means;
    an inlet adapter for connection to a source of dielectric fluid mounted on said conductive wand shaft;
    a conductive hollow wand extension in fluid communication with said inlet adapter fixed for movement therewith;
    a hollow electrode fixed in fluid communication to the end of said wand extension opposite said inlet adapter;
    an insulator secured to said conductive wand shaft for movement therewith;
    a drive plate connected to said insulator block;
    a driven nut drivingly connected to said drive plate for reciprocation of said conductive wand relative to said support means;
    and means for reciprocating said nut including a threaded shaft drivingly engaged to said nut, a drive means for rotating said threaded shaft and a motor for driving said drive means and thereby rotating said threaded shaft;
    said means for reciprocating said nut being mounted in said support means.

2. The tool combination of claim 1 in which the source of dielectric fluid is a source of deionized water.

3. The tool combination of claim 1 in which a means for sensing the position of the wand relative to the support means is included.

4. The tool combination of claim 3 in which the means for sensing the position of the wand is a tap mounted on the insulator for movement along a voltage dividing potentiometer thereby creating a voltage signal dependent on the position of the wand to permit remote monitoring of the wand position.

* * * * *